United States Patent

Mir et al.

(10) Patent No.: US 6,690,135 B2
(45) Date of Patent: Feb. 10, 2004

(54) METHOD FOR COMPENSATING FOR DEAD TIME NON-LINEARITIES IN A PULSE WIDTH MODULATION CONTROLLED SWITCHING SCHEME

(75) Inventors: Sayeed A. Mir, Saginaw, MI (US); Tomy Sebastian, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/056,329

(22) Filed: Jan. 24, 2002

(65) Prior Publication Data

US 2003/0137269 A1 Jul. 24, 2003

(51) Int. Cl.[7] .............................................. G05B 11/28
(52) U.S. Cl. ....................... 318/599; 318/254; 318/138; 318/439; 318/811
(58) Field of Search ................. 318/599, 632, 318/811, 138, 254, 439, 432, 434

(56) References Cited

U.S. PATENT DOCUMENTS

| | | | | |
|---|---|---|---|---|
| 4,622,500 A | * | 11/1986 | Budelman, Jr. | 318/254 |
| 5,023,527 A | | 6/1991 | Erdman et al. | 318/254 |
| 5,550,450 A | | 8/1996 | Palko et al. | 318/800 |
| 5,616,999 A | * | 4/1997 | Matsumura et al. | 318/632 |
| 5,764,024 A | | 6/1998 | Wilson | 318/805 |
| 5,867,380 A | | 2/1999 | Lee | 363/98 |
| 5,991,176 A | | 11/1999 | Saada et al. | 363/58 |
| 6,307,336 B1 | * | 10/2001 | Goff et al. | 318/254 |
| 6,441,578 B1 | * | 8/2002 | Mir et al. | 318/599 |
| 6,448,724 B1 | * | 9/2002 | Kleinau et al. | 318/254 |

FOREIGN PATENT DOCUMENTS

WO  WO 01/20411  3/2001

* cited by examiner

Primary Examiner—Rina Duda
(74) Attorney, Agent, or Firm—Michael D. Smith

(57) ABSTRACT

A method for compensating for dead time non-linearities in a pulse width modulation (PWM) controlled device including obtaining a motor data signal, generating a duty cycle of the motor voltage responsive to the motor data signal, determining a compensation value responsive to the duty cycle of the motor voltage, generating a compensated duty cycle in response to the compensation value and the duty cycle of the motor voltage and introducing the compensated duty cycle to the PWM controlled device. In addition, a medium encoded with a machine-readable computer program code for compensating for dead time non-linearities in a pulse width modulation (PWM) controlled device, the medium including instructions for causing controller to implement the aforementioned method.

30 Claims, 5 Drawing Sheets

METHOD FOR COMPENSATING FOR DEAD TIME NON-LINEARITIES IN A PULSE WIDTH MODULATION CONTROLLED SWITCHING SCHEME

BACKGROUND OF THE INVENTION

This invention relates generally to systems or devices that employ pulse width modulation (PWM) controlled switching schemes and more particularly to a method for compensating for dead time non-linearities in PWM controlled switching schemes.

In most alternating current (AC) motors, a full bridge power inverter is used to apply a PWM voltage across the motor phases in order to control the motor for applications such as electric power steering or hand wheel actuators of steer by wire systems. Typically, the PWM switching method is used to control the speed and operation of the motor by modulating the pulse width of the signals that drive the power inverters. However, one problem with this approach is the effect caused by the propagation delay in the power switches which can cause a short at the switching point. To avoid this, a dead time is inserted between the turn off of one switch and the turn on of a complementary switch. During this dead time, both of the switches are in an off state. In effect, this dead time causes a non-linearity in the effective voltage applied across the motor phase causing a torque ripple.

The loss of voltage due to this dead time makes the average output motor torque less than the desired output motor torque causing a non-linear relationship between the desired, or commanded torque and the actual output torque of the motor. The sign of the voltage disturbance, either negative or positive, depends upon the sign of the AC current produced by the motor. This disturbance changes sign at every zero phase crossing of the motor current. Thus, since each 3-phase permanent magnet AC motor produces a motor current having six zero crossings per electrical revolution, a six per electrical revolution torque ripple is induced into the motor torque, in addition to other frequency components of torque ripple which may be introduced depending upon the PWM switching method.

Referring to FIG. 1, the effect of the dead time on the output motor torque of a permanent magnet AC motor having an input torque command of 0.5 Nm is illustrated. As can be seen, there is a six per electrical revolution torque ripple having a magnitude of approximately 14 mNm. In addition, this dead time may cause the output motor torque to be significantly less than the input torque command. In this particular case, for an input torque command of 0.5 Nm, the output motor torque is approximately 0.413 Nm. As a result, in torque sensitive applications such as electric power steering or steer by wire systems, this torque ripple degrades the performance of the system and is undesirable.

Although methods to solve this problem have been proposed, these methods involve active probing or estimating of phase currents, see U.S. Pat. No. 5,550,450 to Palko, et al. and U.S. Pat. No. 5,764,024 to Wilson, D. L. However, for permanent magnet AC motor drives that utilize a voltage mode control design, this can be expensive and time consuming. This is because, in voltage mode control designs, the motor torque is regulated by controlling the motor phase voltage rather than the current as in current mode control methods where the active phase current is not normally measured or estimated. Thus, additional current sensing or probing circuitry would have to be added to existing designs. This takes time and increases operating costs.

SUMMARY OF THE INVENTION

A method for compensating for dead time non-linearities in a pulse width modulation (PWM) controlled device comprising: obtaining a motor data signal; generating a duty cycle of the motor voltage responsive to the motor data signal; determining a compensation value responsive to the duty cycle of the motor voltage; generating a compensated duty cycle in response to the compensation value and the duty cycle of the motor voltage; and introducing the compensated duty cycle to the PWM controlled device.

In addition, a medium encoded with a machine-readable computer program code for compensating for dead time non-linearities in a pulse width modulation (PWM) controlled device, the medium including instructions for causing a controller to implement the aforementioned method.

BRIEF DESCRIPTION OF THE DRAWINGS

The above discussed and other features and advantages will be appreciated and understood by those skilled in the art from the following detailed description and drawings, wherein like elements are designated by like numerals in the several figures.

Referring now to the drawings.

DESCRIPTION OF A PREFERRED EMBODIMENT

Figure 1:
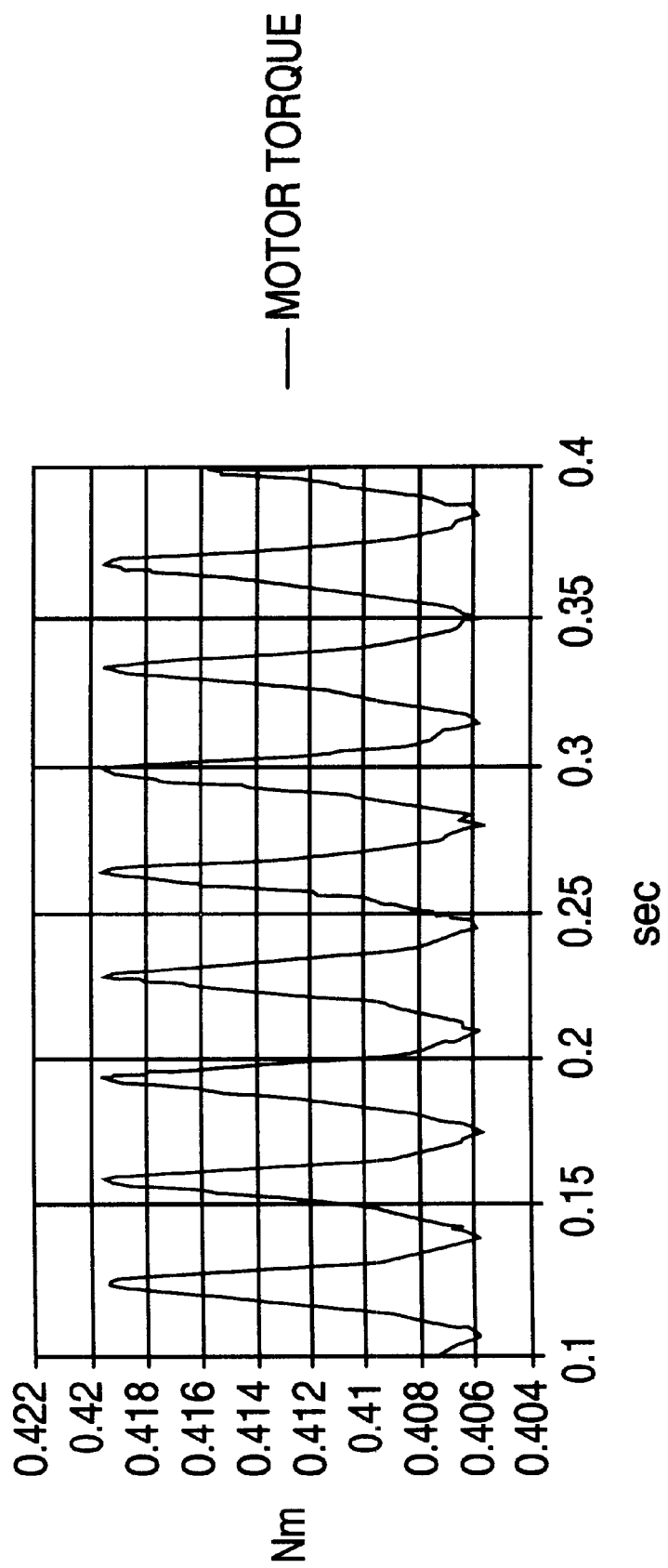
FIG. 1 is a graph representing the output motor torque of a permanent magnet AC motor corresponding to an input torque command of 0.5 Nm and having a dead time of 400 nsec and running at a PWM frequency of 20 Khz.
Figure 2:
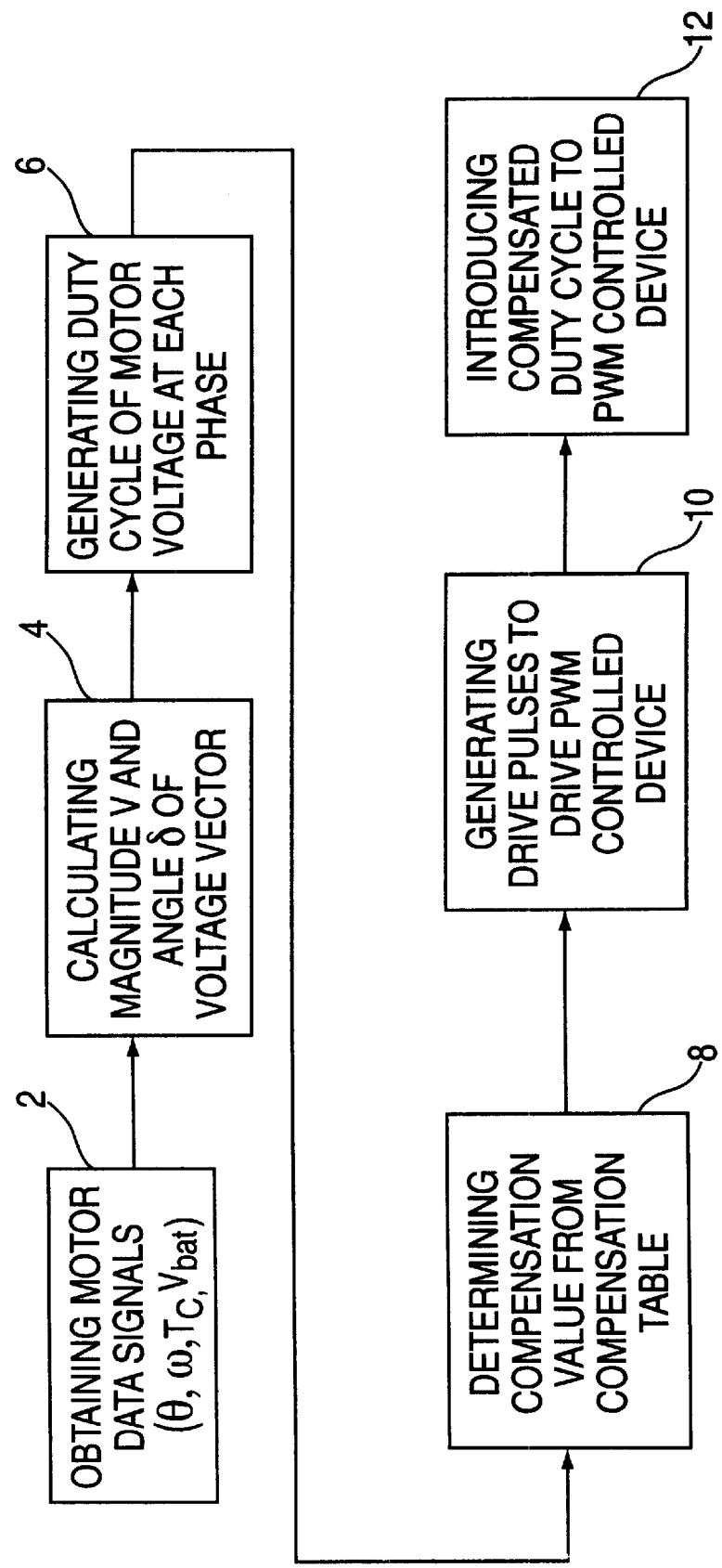
FIG. 2 is a block diagram describing a method for compensating for dead time non-linearities in a PWM controlled device in accordance with an embodiment.
Figure 3:
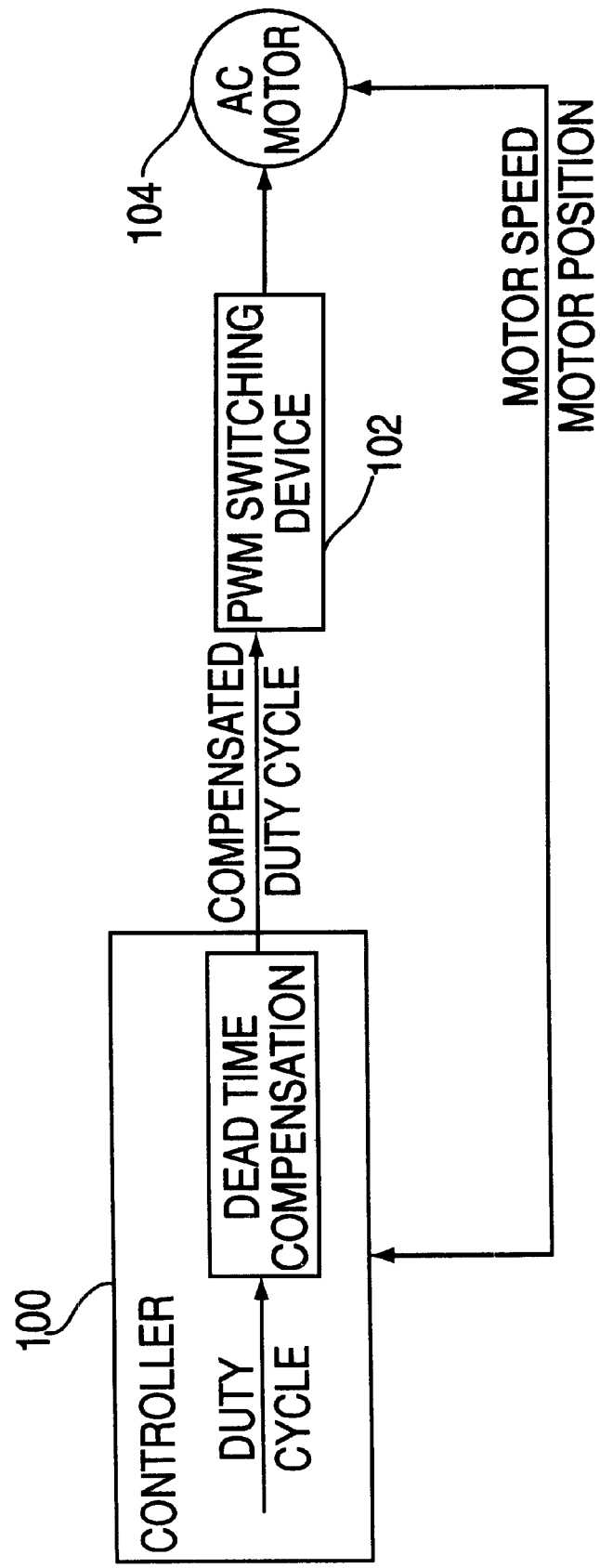
FIG. 3 is a system diagram illustrating an overall view of a PWM controlled device in accordance with an embodiment.

Referring to FIG. 2 and FIG. 3, a system diagram illustrating an overall view of a PWM controlled switching scheme and a method for compensating for dead time non-linearities in a PWM controlled device is shown and described. It should be noted that although the method of this invention is described using an AC motor having a PWM switching device as a PWM controlled device, it is considered within the scope of the invention that the method of this invention may be applied to any PWM controlled device suitable to the desired end purpose.

In accordance with an exemplary embodiment, a PWM controlled switching scheme is illustrated and preferably includes a controller 100 and a PWM controlled device 103 having a PWM switching device 102 and an AC motor 104, wherein the controller 100 is communicated with PWM switching device 102 and AC motor 104 and wherein PWM controlled switching device 102 is further communicated with AC motor 104.

Again, referring to FIG. 2 and FIG. 3, once operation of AC motor 104 is initiated, motor data signals are obtained from at least one motor data sensor as in step 2. In accordance with an embodiment, motor data signals preferably include a motor position θ, a vehicle battery voltage ($V_{bat}$), a motor speed ω and/or torque command ($T_c$), wherein the torque command ($T_c$) is responsive to the desired system torque. Upon obtaining these motor data signals, the voltage vector magnitude, V, and the voltage vector angle, δ, are calculated by controller 100 in a manner responsive to the torque command $T_c$ and the motor speed ω, as shown in step 4.

Once the voltage vector magnitude V and the voltage vector angle δ are calculated, the duty cycle of the motor voltage at each phase (dph) is generated in a manner responsive to the voltage vector magnitude V, the voltage vector angle δ, the motor position θ and the vehicle battery voltage ($V_{bat}$), as shown in step 6. A compensation value (dc) responsive to the dead time of PWM switching device 102 is then determined as shown in step 8. In accordance with an exemplary embodiment, the dead time of PWM switching device 102 is preferably a predetermined value and is preferably responsive to the characteristics of PWM switching device 102. The compensation value is determined by accessing a compensation table stored within controller 100 and obtaining the compensation value corresponding to the generated duty cycle of the motor voltage at each phase, the motor speed ω and the dead time of the switching device 102. In accordance with an exemplary embodiment, the compensation table is preferably generated based upon data responsive to the physical and/or performance characteristics of the PWM switching device 102 and the AC motor 104. The compensation values contained within the compensation table may be based on experimentation, estimation and/or calculation. Also, in accordance with an exemplary embodiment, the compensation values may be based on any component, system or environmental characteristic suitable to the desired end purpose. In accordance with an exemplary embodiment, although the compensation table is preferably stored within controller 100, it is considered within the scope of the invention that the compensation table may be stored within any storage device suitable to the desired end purpose.

Once the compensation value has been determined, controller 100 generates a compensated duty cycle responsive to the motor position θ, the duty cycle of the motor voltage at each phase and the compensation value. Using this compensated duty cycle, controller 100 generates drive pulses for driving PWM switching device 102, as shown in step 10. In accordance with an exemplary embodiment, although the drive pulses preferably have a frequency of 20 kHz, the drive pulses may be of any frequency suitable to the desired end purpose. Moreover, the drive pulses are preferably generated in a manner responsive to the compensated duty cycle and the dead time of PWM switching device 102 and are discussed further hereinbelow. The compensated duty cycle is then introduced into the PWM switching device 102 by introducing the generated drive pulses into PWM controlled switching device 102 as shown in step 12. In accordance with an exemplary embodiment, the introduction of these drive pulses into PWM controlled switching device 102 are preferably delayed by the dead time of PWM switching device 102 so as to avoid any interference between the switching devices within PWM switching device 102. This preferably allows PWM controlled switching device 102 to be 'driven' so as to compensate for any dead time non-linearities.

Figure 4:
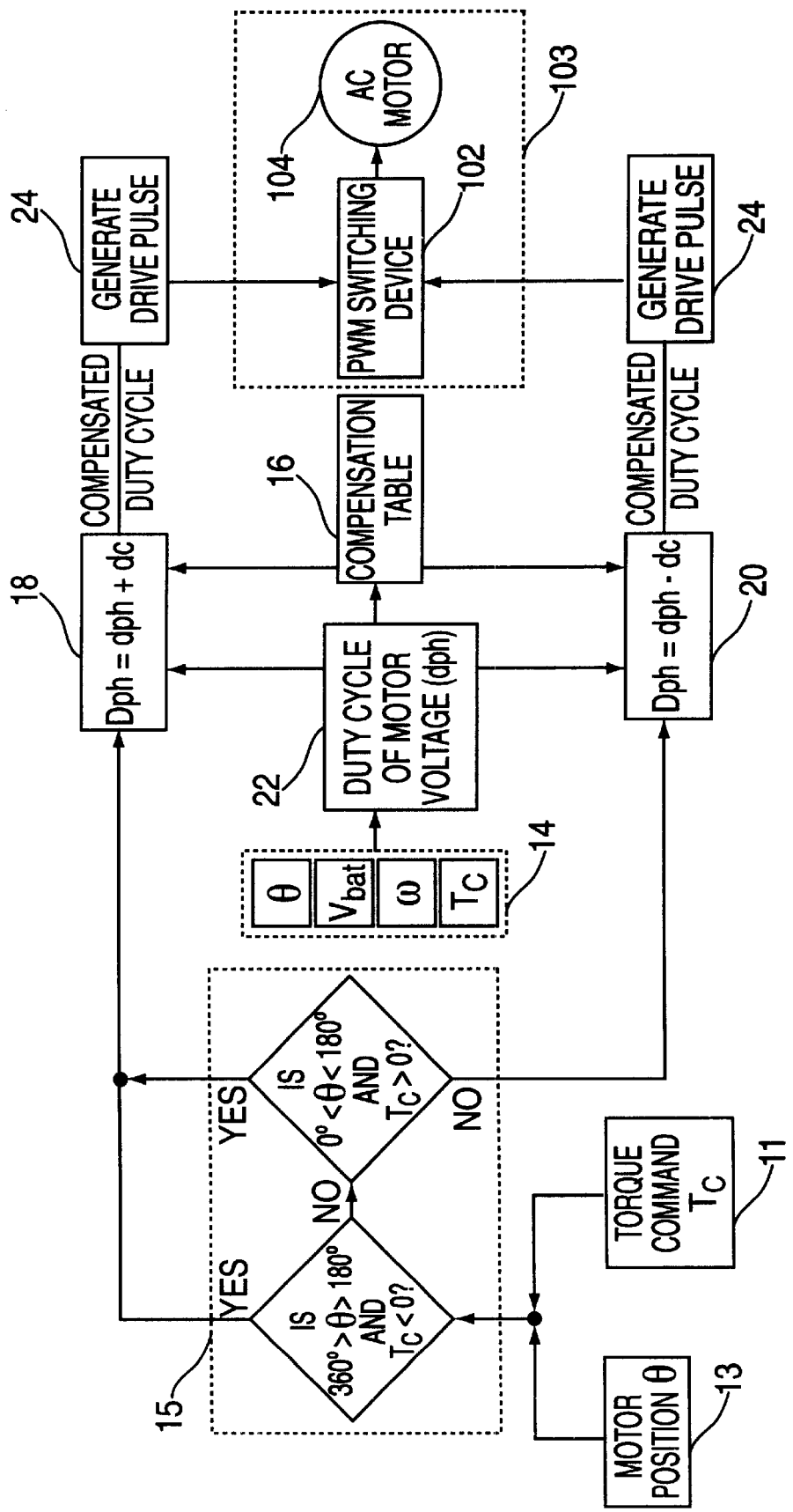
FIG. 4 is a functional flow diagram describing a method for compensating for dead time non-linearities in a PWM controlled device in accordance with an embodiment.

Referring to FIG. 3 and FIG. 4, a more detailed explanation of one embodiment of a method for compensating for dead time non-linearities in a PWM controlled device is shown and described. In accordance with one embodiment, motor data signals 14 are obtained. The motor data signals 14, which preferably includes vehicle battery voltage ($V_{bat}$), motor position θ, motor speed (ω) and the torque command ($T_c$), are then used by controller 100 to generate the duty cycle of the motor voltage (dph) 22 at each phase. Using these motor data signals 14 and/or the generated duty cycle of the motor voltage (dph) 22, the controller then determines the compensation value (dc) from compensation table 16. Using the compensation value (dc) and the duty cycle of the motor voltage (dph) 22 at each phase, controller 100 generates a compensated duty cycle (Dph) in a manner responsive to the motor position (θ) 13 and the torque command ($T_c$) 11. This is done as follows.

The motor position (θ) 13 and the torque command ($T_c$) 11 are examined in 15 in order to determine if the motor position (θ) 13 is between 0° and 180° and if the torque command ($T_c$) 11 is greater than 0 or if the motor position (θ) 13 is between 180° and 360° and if the torque command ($T_c$) 11 is less than 0. If it is determined that the motor position (θ) 13 is between 0° and 180° and if the torque command ($T_c$) 11 is greater than 0 or if it is determined that the motor position (θ) 13 between 180° and 360° and if the torque command ($T_c$) 11 is less than 0, then the compensated duty cycle (Dph) is generated by adding the compensation value (dc) and the duty cycle of the motor voltage (dph) 22, as shown in 18. Otherwise, the compensated duty cycle (Dph) is generated by subtracting the compensation value (dc) from the duty cycle of the motor voltage (dph) 22, as shown in 20. Controller 100 then generates drive pulses 24 using this compensated duty cycle (Dph) and the dead time of PWM switching device 102. Controller 100 then introduces these drive pulses into PWM switching device 102 in a delayed fashion as described hereinabove. In accordance with an exemplary embodiment, the drive pulses are preferably generated by controller 100. However, it is considered within the scope of the invention that the drive pulses may be generated by any method or device, external and/or internal to controller 100, suitable to the desired end purpose.

In accordance with an exemplary embodiment, compensation table 16 is preferably generated based on the characteristics of the switching devices disposed within the PWM controlled switching device 102, the dead time inserted by the switching devices and the AC motor speed (ω). At very low duty cycles, the timing of the gate signals of the switching devices is not enough to put the switching devices (MOSFET) in a fully enhanced mode because the effective voltage at the output of the switching device (MOSFET) is lower than the voltage at the input of the switching device. However, as the duty cycle is increased, the switching device (MOSFET) goes into a fully enhanced mode after a certain rise time and any loss of voltage due to this rise time becomes insignificant. As a result, the compensation for the rise time is decreased as the duty cycle is increased. However, the dead time of the PWM controlled switching device 102 is a constant term and has a constant contribution to the compensation value (dc). Thus, at higher duty cycles the magnitude of the compensation value decreases and eventually stabilizes at a constant minimum value. Whereas at lower duty cycles the magnitude of the compensation value increases so as to compensate for the dead time of PWM controlled switching device 102 and any loss of voltage due to rise time of the switching device (MOSFET). In effect, as the duty cycle increases the magnitude of the compensation value decreases.

Figure 5:
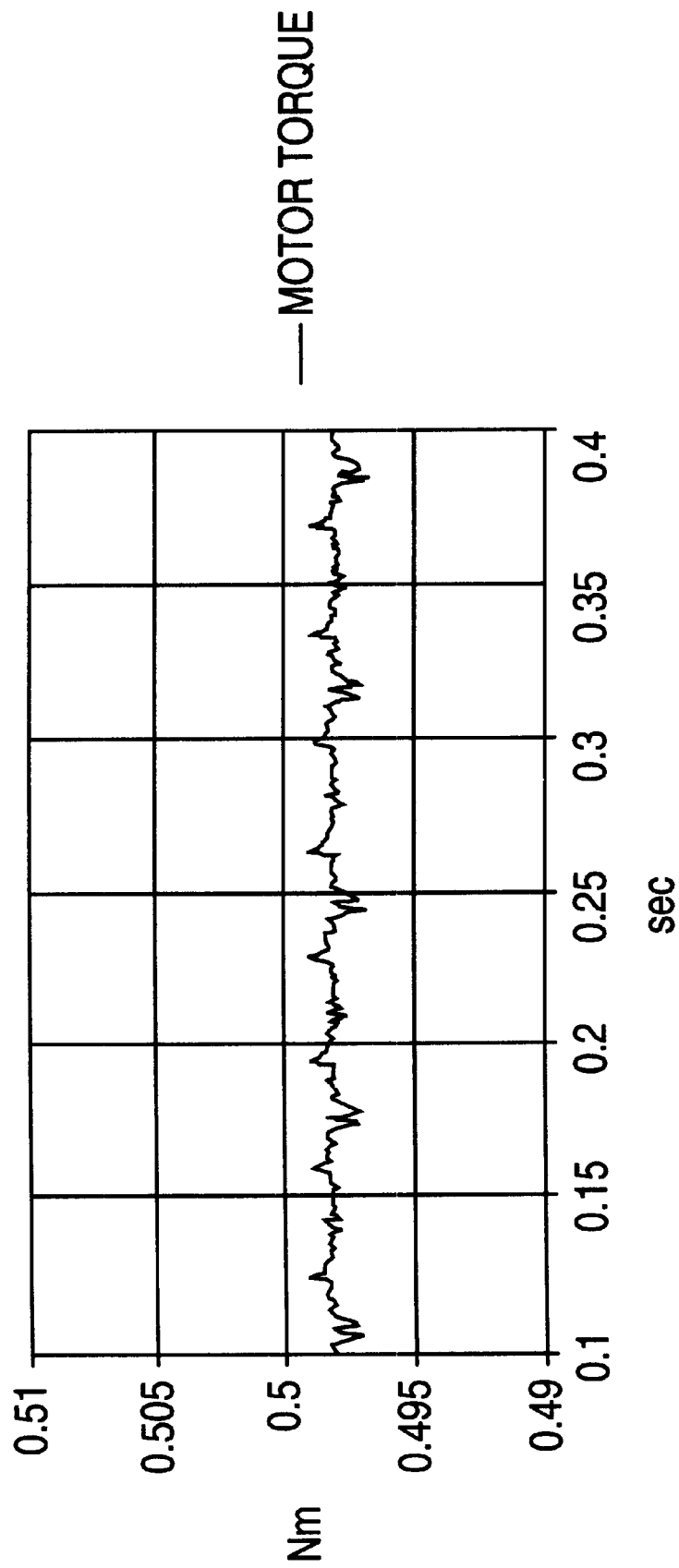
FIG. 5 is a graph representing the output motor torque of a permanent magnet AC motor corresponding to an input torque command of 0.5 Nm, in accordance with an embodiment.

In accordance with an exemplary embodiment, FIG. 5 illustrates the motor torque output of an AC motor drive that corresponds to an input torque command ($T_c$) of 0.5 Nm. As can be seen, the ripple and the magnitude of the output motor torque for an AC motor drive that employs a PWM controlled switching device using the method of the invention is significantly and advantageously improved over similar systems that do not apply the method of the invention.

As an example, in an electric power steering application at low motor speeds ($\omega$) and high motor torque levels where any torque ripple present is most critical, the frequency of the torque ripple is relatively low. Whereas, at high motor speeds ($\omega$) the frequency of the torque ripple due to dead time becomes relatively high, most of the ripple is filtered within the system and hence does not affect system performance. At lower motor speeds ($\omega$) the motor phase current is controlled so as to be in phase with the motor back EMF. The motor back EMF is synchronized with the motor position ($\theta$) 13 and thus allows the motor phase current to be synchronized with the motor position ($\theta$) 13. However, at higher motor speeds ($\omega$), where the phase current is phase advanced with respect to the motor back EMF, the motor back EMF is no longer in phase with motor position ($\theta$) 13, and the compensation value is slowly ramped down to zero. In accordance with an exemplary embodiment, the duty cycle compensation is preferably responsive to motor speed ($\omega$) so as to ramp down to zero at a predetermined rate.

In accordance with an exemplary embodiment, the motor position ($\theta$) 13 may be obtained using any motor position-sensing device (i.e. such as an optical-encoder, a resolver or a hall effect sensor) or method (i.e. such as calculations and/or estimations) known in the art and suitable to the desired end purpose.

In accordance with an exemplary embodiment, the motor data signals may be obtained using any motor data signal measuring device or method (i.e. such as calculations and/or estimations) known in the art and suitable to the desired end purpose.

In accordance with an exemplary embodiment, controller 100 is preferably an electronic control module (ECM). However, controller 100 may be any controller 100 suitable to the desired end purpose.

In accordance with an exemplary embodiment, compensation table 16 may be stored via any suitable storage method known in the art and suitable to the desired end purpose, such as electronically erasable programmable read only memory (EEPROM).

Processing of FIG. 2 may be implemented through a controller 100 operating in response to a computer program. In order to perform the prescribed functions and desired processing, as well as the computations therefore (e.g., the calculation of compensation table 16, the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include signal input signal filtering to enable accurate sampling and conversion or acquisitions of such signals from communications interfaces.

The disclosed invention can be embodied in the form of a computer or controller implemented processes. The present invention can also be embodied in the form of computer program code containing instructions embodied in tangible media, such as floppy diskettes, CD-ROMs, hard drives, or any other computer-readable medium, wherein when the computer program code is loaded into and executed by a computer or controller, the computer or controller becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for compensating for dead time non-linearities in a pulse width modulation (PWM) controlled device comprising:

obtaining a motor data signal;

generating a duty cycle of the motor voltage responsive to said motor data signal;

determining a compensation value responsive to said duty cycle of the motor voltage;

generating a compensated duty cycle in response to said compensation value and said duty cycle of the motor voltage; and introducing said compensated duty cycle to said PWM controlled device, wherein generating a duty cycle includes calculating a voltage vector magnitude and a voltage vector angle, wherein said voltage vector magnitude and said voltage vector angle are responsive to said motor data signal.

2. The method according to claim 1, wherein said motor data signal includes motor speed.

3. The method according to claim 1, wherein said motor data signal includes motor position.

4. The method according to claim 1, wherein said motor data signal includes torque command.

5. The method according to claim 1, wherein said determining a compensation value includes accessing a compensation table having said compensation value.

6. The method according to claim 5, wherein said determining a compensation value includes retrieving said compensation value from said compensation table.

7. The method according to claim 1, wherein said generating a compensated duty cycle includes generating said compensated duty cycle via a controller.

8. The method according to claim 1, wherein said generating a compensated duty cycle includes generating a drive pulse responsive to said compensated duty cycle.

9. The method according to claim 1, wherein said compensated duty cycle is further responsive to said motor data signal.

10. The method according to claim 1, wherein said introducing said compensated duty cycle includes introducing said compensated duty cycle to said PWM controlled device via a controller.

11. The method according to claim 1, wherein said introducing said compensated duty cycle includes introducing said compensated duty cycle via a generated drive pulse.

12. The method according to claim 1, further comprising a compensation table, wherein said compensation table is stored via an electronically erasable programmable read only memory (EEPROM).

13. The method according to claim 1, wherein said PWM controlled device includes a motor and a PWM switching device.

14. A method for compensating for dead time non-linearities in a pulse width modulation (PWM) controlled device comprising:

obtaining a motor data signal;

generating a duty cycle of the motor voltage responsive to said motor data signal;

determining a compensation value responsive to said duty cycle of the motor voltage;

generating a compensated duty cycle in response to said compensation value and said duty cycle of the motor voltage; and introducing said compensated duty cycle to said PWM controlled device, wherein said PWM controlled device includes a motor and a PWM switching device, and said introducing said compensated duty cycle includes introducing said compensated duty cycle responsive to a dead time of said PWM switching device.

15. The method of claim 14, wherein said motor data signal includes at least one of motor position and torque command, and said determining said compensation value includes:

determining a magnitude of said compensation value responsive to said duty cycle of the motor voltage; and determining a direction of said compensation value responsive to said at least one of motor position and torque command, said compensated duty cycle being responsive to said direction and said magnitude of said compensation value.

16. A medium encoded with a machine-readable computer program code for compensating for dead time non-linearities in a pulse width modulation (PWM) controlled device, said medium including instructions for causing a controller to implement a method comprising:

obtaining a motor data signal;

generating a duty cycle of the motor voltage responsive to said motor data signal;

determining a compensation value responsive to said duty cycle of the motor voltage;

generating a compensated duty cycle in response to said compensation value and said duty cycle of the motor voltage; and introducing said compensated duty cycle to said PWM controlled device, wherein generating a duty cycle includes calculating a voltage vector magnitude and a voltage vector angle, wherein said voltage vector magnitude and said voltage vector angle are responsive to said motor data signal.

17. The medium of claim 16, wherein said motor data signal includes motor speed.

18. The medium of claim 16, wherein said motor data signal includes motor position.

19. The medium of claim 16, wherein said motor data signal includes torque command.

20. The medium of claim 16, wherein said determining a compensation value includes accessing a compensation table having said compensation value.

21. The medium of claim 20, wherein said determining a compensation value includes retrieving said compensation value from said compensation table.

22. The medium of claim 16, wherein said generating a compensated duty cycle includes generating said compensated duty cycle via a controller.

23. The medium of claim 16, wherein said generating a compensated duty cycle includes generating a drive pulse responsive to said compensated duty cycle.

24. The medium of claim 16, wherein said compensated duty cycle is further responsive to said motor data signal.

25. The medium of claim 16, wherein said introducing said compensated duty cycle includes introducing said compensated duty cycle to said PWM controlled device via a controller.

26. The medium of claim 16, wherein said introducing said compensated duty cycle includes introducing said compensated duty cycle via a generated drive pulse.

27. The medium of claim 16, further comprising a compensation table, wherein said compensation table is stored via an electronically erasable programmable read only memory (EEPROM).

28. The medium of claim 16, wherein said PWM controlled device includes a motor and a PWM switching device.

29. A medium encoded with a machine-readable computer program code for compensating for dead time non-linearities in a pulse width modulation (PWM) controlled device, said medium including instructions for causing a controller to implement a method comprising:

obtaining a motor data signal;

generating a duty cycle of the motor voltage responsive to said motor data signal;

determining a compensation value responsive to said duty cycle of the motor voltage;

generating a compensated duty cycle in response to said compensation value and said duty cycle of the motor voltage; and introducing said compensated duty cycle to said PWM controlled device, wherein said PWM controlled device includes a motor and a PWM switching device and said introducing said compensated duty cycle includes introducing said compensated duty cycle responsive to a dead time of said PWM switching device.

30. The medium of claim 29, wherein said motor data signal includes at least one of motor position and torque command, and said determining said compensation value includes:

determining a magnitude of said compensation value responsive to said duty cycle of the motor voltage; and determining a direction of said compensation value responsive to said at least one of motor position and torque command, said compensated duty cycle being responsive to said direction and said magnitude of said compensation value.

* * * * *